United States Patent [19]

Nakagawa et al.

[11] 4,271,795
[45] Jun. 9, 1981

[54] INTERNAL COMBUSTION ENGINE WITH DUAL INDUCTION SYSTEM AND WITH FUEL INJECTION SYSTEM TO DISCHARGE FUEL INTO SECONDARY INDUCTION SYSTEM

[75] Inventors: Yasuhiko Nakagawa, Kamakura; Yukihiro Etoh, Yokohama; Meroji Nakai, Yokosuka; Ryoji Nakajima, Yokohama, all of Japan

[73] Assignee: Nissan Motor Company, Limited, Yokohama, Japan

[21] Appl. No.: 966,373

[22] Filed: Dec. 4, 1978

[30] Foreign Application Priority Data

Dec. 19, 1977 [JP] Japan ................. 52/152553

[51] Int. Cl.³ ............................................. F02B 31/00
[52] U.S. Cl. ................................. 123/308; 123/432; 123/188 M
[58] Field of Search ................. 123/30 C, 75 B, 79 C, 123/188 M

[56] References Cited

U.S. PATENT DOCUMENTS

| | | | |
|---|---|---|---|
| 3,318,292 | 5/1967 | Kideg | 123/30 C |
| 3,678,905 | 7/1972 | Diehl | 123/188 M |
| 3,918,419 | 11/1975 | Dolza | 123/75 B |
| 4,014,960 | 3/1977 | Goto et al. | 123/127 |
| 4,077,363 | 3/1978 | Noguchi et al. | 123/75 B |
| 4,174,686 | 11/1979 | Shimizu et al. | 123/75 B |
| 4,181,105 | 1/1980 | Takemoto et al. | 123/75 B |

FOREIGN PATENT DOCUMENTS 449932 12/1972 Australia .

Primary Examiner—Charles J. Myhre
Assistant Examiner—Andrew M. Dolinar
Attorney, Agent, or Firm—Lowe, King, Price & Becker

[57] ABSTRACT

A spark ignition fuel injection reciprocatory internal combustion engine with dual induction system is provided which has within a cylinder head a primary intake port passage to direct air charge into a cylinder to swirl therein and a secondary intake port passage to direct air charge into the cylinder in such a direction as to impede and reduce the swirling motion of the air charge issuing from the primary intake port passage. An intake valve, including a valve stem and a valve head, is reciprocably mounted within the cylinder head, and an annular wall or tube is fixedly positioned in a bore in the cylinder head. The primary intake port passage communicates with the exterior of this tube and the secondary intake port passage communicates with the interior of the tube. This tube extends to a position closely adjacent to, or in engagement with, the valve head of the intake valve when the valve is in the closed position. A fuel injector, mounted to the cylinder head, discharges fuel into the secondary intake port passage toward the central portion of the head and synchronization with the opening of the intake valve so that the fuel issuing from the fuel injector will impinge upon the valve head and then disperse radially outwardly toward the periphery of the valve head. An air flow sensor is provided upstream of primary and secondary throttle valves to detect the total of flow of induction air fed to the engine so that fuel is discharged at a rate proportional to the total induction air flow.

2 Claims, 2 Drawing Figures

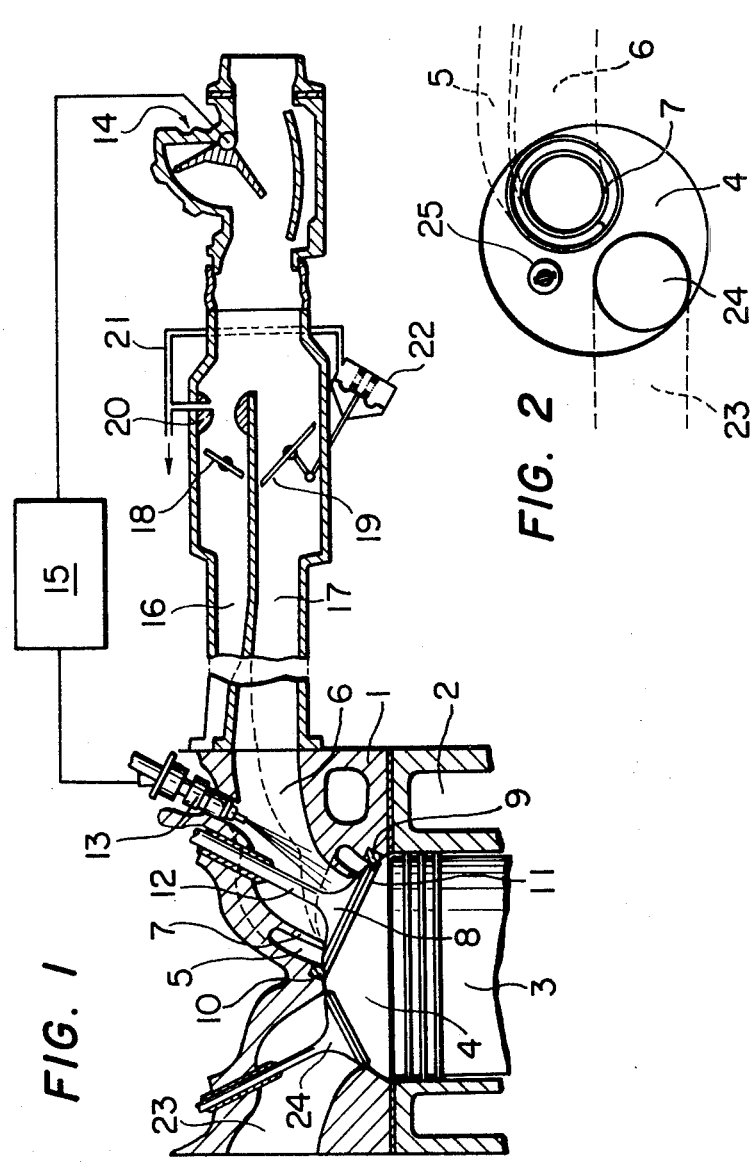

INTERNAL COMBUSTION ENGINE WITH DUAL INDUCTION SYSTEM AND WITH FUEL INJECTION SYSTEM TO DISCHARGE FUEL INTO SECONDARY INDUCTION SYSTEM

BACKGROUND OF THE INVENTION

The present invention relates to an internal combustion engine with dual induction system including a primary induction system to direct a first fluid charge into a cylinder to swirl therein under all operating conditions of the engine and a secondary induction system to direct a second fluid charge into the cylinder in such a direction as to impede and reduce the swirling motion of the first fluid charge issuing from the primary induction system under predetermined operating conditions of the engine, thereby maintaining the volumetric efficiency at sufficiently high level. More particularly, the invention relates to an arrangement of fuel injectors of a fuel injection system for an internal combusiton engine as above.

In the case of installing a fuel injection in the engine with dual induction system as mentioned above, it is possible to arrange two fuel injectors per each cylinder, one for discharging fuel into a primary intake port passage and the other into a secondary intake port passage. The arrangement requires twice the number of fuel injectors as required in the usual induction system for an engine with single induction system. Furthermore, a complicated control for the fuel injector of the secondary intake port passage is required, thus boosting up the cost of the fuel injection system.

SUMMARY OF THE INVENTION

The invention includes a cylinder having a piston reciprocably mounted therein. A cylinder head is positioned over one end of the cylinder. An intake valve, including a valve stem and a valve head having a face, is mounted within the cylinder head, a valve seat for receiving the face is mounted to the cylinder head at one end of a bore therein, and an annular wall or tube is mounted within the bore. A primary induction system, adapted to direct air into the cylinder to swirl therein under all operating conditions of the engine, communicates with the exterior of the annular wall, while, a secondary induction system, adapted to direct air into the cylinder in such a direction as to impede and reduce the swirling motion under predetermined operating conditions of the engine, communicates with the interior of the annular wall. The annular wall extends to a position closely adjacent to, or in engagement with, the head of the intake valve when the valve is in the closed position to provide a seal between the primary and secondary induction systems within the cylinder head. A fuel injector is so positioned as to discharge fuel toward the head of the intake valve so that fuel will impinge on the head to disperse radially outwardly toward the periphery of the head.

An object of the present invention is to provide an internal combustion engine with dual induction system in which with a single injector an appropriate amount of fuel can be fed to the corresponding cylinder without requiring a complicated fuel injection control as compared to a fuel injection system for an internal combustion engine with single induction system.

BRIEF DESCRIPTION OF THE DRAWINGS

In the accompanying drawings:

FIG. 1 is a diagrammatic longitudinal sectional view of an internal combustion engine with dual induction system and with fuel injection system according to the present invention; and FIG. 2 is a plan view of one of cylinders of the engine.

DESCRIPTION OF THE PREFERRED EMBODIMENT

Referring to FIGS. 1 and 2, the reference numeral 1 denotes a cylinder head, the reference numeral denotes a cylinder block, the reference numeral 3 denotes a piston, and the reference numeral 4 denotes a combustion chamber.

Each combustion chamber 4 is provided with a primary intake port passage 5 positioned within the cylinder head 1 and with a secondary intake port passage 6 positioned within the cylinder head 1. With an annular partition wall or a tube 7, the secondary port passage 6 and the primary port passage 5 are separated, the secondary port passage connecting with the interior of the annular partition wall 7, while, the primary port passage 5 connecting with the exterior of the annular partition wall 7.

Through the primary intake port passage 5 air is drawn into the combustion chamber 4 during all of operating conditions of the engine, while, through the secondary intake port passage 6 air is drawn into the combustion chamber 4 during operating condition at high speeds with high loads. These port passages 5 and 6 are closed or opened by a single intake valve 8, including a valve stem and a valve head having a face 10.

When the intake valve 8 is in the closed position, the face 10 is in engagement with a valve seat 9 affixed to the periphery of the opening of the primary port passage 5. The valve head has a beveled portion 11 around the valve stem and when the intake valve 8 is in the closed position, the annular partition wall 7 extends to a position closely adjacent, or in engagement with the beveled portion 11 to provide a seal between the port passages 5 and 6. A rubber seal may be employed to secure the seal, if desired.

It is possible to affix a valve seat to the axial end of the annular partition wall 7 for receiving the beveled portion 11 of the valve head of the intake valve 8.

A fuel injector 13 is mounted to each secondary port passage 6 so as to discharge or direct a spray of fuel toward the center of the beveled portion 11 of the valve head of the intake valve 8 from which a valve stem 12 extends.

Each fuel injector 13 is energizable or actuable in response to an pulsation signal from a control apparatus 15 which determines the quantity of fuel per each injection in response to a signal from an air flow sensor 13 so as to discharge fuel in accordance with the induction air.

The primary port passage 5 is so curved as to direct air tangentially into the cylinder to swirl within the combustion chamber 4 around the cylinder axis. The secondary port passage 6 has a larger effective cross sectional area and provides less resistance, in configuration, to induction of air than the primary port passage 5. In particular, the secondary port passage is so angled as to direct air into the cylinder in such a direction as to impede and reduce the swirling motion within the combustion chamber 4.

A primary intake manifold passage 16 connects with the primary port passage 5, while, a secondary intake manifold passage 17 connects with the secondary port passage 6. Air drawn through the primary manifold passage 16 is controlled by a primary throttle valve 18, while, air drawn through the secondary manifold passage 17 is controlled by a secondary throttle valve 19.

The primary throttle valve 18 is operatively linked with an accelerator pedal, not shown, to be opened or closed by the accelerator pedal. The secondary throttle valve 19 is operatively connected to and actuable by a diaphragm device 22 which is operative in response to a vacuum taken from venturi 20 upstream of the primary throttle valve 18 via a vacuum line 21. The diaphragm device 22 commences to open the secondary throttle valve 19 when the venturi vacuum increases beyond a predetermined level as the flow rate through the primary side increases.

Instead of the venturi vacuum within the venturi 20, an amplified venturi vacuum for control of EGR, if any, may be used as the vacuum for actuating the diaphragm device 22.

Upstream of the primary throttle valve 18 and of the secondary throttle valve 19, the air flow sensor 14 is mounted to detect the total of induction air fed to the engine through the primary and secondary induction conduits 16 and 17. In the Figures, the reference numeral 23 denotes an exhaust port passage, the reference numeral 24 denotes an exhaust valve, and the reference numeral 25 denotes an ignition or spark plug.

When the engine operates at low and intermediate speeds with low and intermediate loads, the primary throttle valve 18 opens, thereby supplying air into the combustion chamber 4 through the primary port passage 5 to swirl therein.

Under these conditions the all of induction air passes through the primary manifold passage 16 whose primary throttle valve 18 is opened and this amount is detected by the air flow sensor 14. In response to the output from the air flow sensor 14 representative of the amount of induction air, the control apparatus 15 provides a fuel injection signal to the fuel injector 13. The fuel injector 13 discharges fuel toward the beveled portion 11 of the valve head of the intake valve 8.

Fuel injection timing should coincide with the opening of the intake valve 8. Fuel issuing from the fuel injector 13 will impinge upon the beveled portion 11 of the intake valve 8 and then disperse radially outwardly away from the valve stem 12 toward the periphery of the valve head. The thus dispersed fuel will meet with air issuing from the primary port passage 5 and will enter the combustion chamber 4 together with the air from the primary port passage 5.

Since the air drawn from the primary port passage 4 will swirl within the combustion chamber 4, the fuel and air will be mixed well within the combustion chamber 4 and evaporation of fuel will be facilitated. This swirl is strong enough so that it will be sustained till the end of the subsequent compression stroke or till the initial stage of the subsequent expansion stroke. As a result, the combustion at low and intermediate loads has been remarkably stabilized. This therefore will make it possible to operate the engine on a lean air fuel mixture or with heavy EGR.

When the engine operates at high speeds with high loads, the diaphragm device 22 urges the secondary throttle valve 19 to open by detecting the amount of induction air flowing through the venturi 20, thus admitting air into the combustion chamber 4 through the secondary port passage 6, too. Under these operating conditions, the air flow sensor 14 detects the total, in amount, of induction air entering the primary intake manifold passage 16 and that entering the secondary manifold passage 17 so that the quantity of fuel per each injection from the fuel injector 13 will increase accordingly.

The thus increased fuel will enter the combustion chamber 4 together with air drawn from the primary and secondary intake port passages 5 and 6. Since, at high loads, a relatively large amount of air flows into the combustion chamber 4 through the secondary port passage 6 at a high velocity, the fuel can be atomized well, thus stabilizing combustion. Because air is supplied also through the secondary port passage 6 and air drawn therefrom impedes and reduces the swirling motion in the combustion chamber 4 to increase the volumetric efficiency of the engine, the engine can yield sufficiently high power output at wide open throttle.

Since, according to the invention, fuel is discharged from a fuel injector toward beveled portion 11 of the valve head of the intake valve 8 to impinge thereon for subsequent radially outward dispersion, the fuel can be atomized well and distributed well throughout all operating conditions ranging from the engine operation at low engine speeds to the engine operating at high engine speeds.

Since a fuel injector is provided per each cylinder, the construction and arrangement of the fuel injection control has been simplified.

What is claimed is:

1. In an internal combustion engine including means defining a cylinder having a longitudinal axis and a piston slidably disposed in said cylinder to define a variable volume combustion chamber, a dual induction system comprising:
   an air flow meter,
   a primary induction passage leading from downstream of said air flow meter to a first valve controlled inlet port of said combustion chamber, said primary induction passage and said first inlet port being so constructed and arranged as to introduce the air flowing therethrough into said combustion chamber in a direction tangential with respect to the wall of said cylinder so that the air thereafter swirls around said axis of said cylinder,
   a fixed venturi disposed at the upstream end of said primary induction passage,
   a first throttle valve operatively disposed in said primary induction passage downstream of said venturi,
   a secondary induction passage leading from downstream of said flow meter to a second valve controlled inlet port of said combustion chamber, said secondary induction passage and said second inlet port being so constructed and arranged as to introduce air flowing therethrough into said combustion chamber in a direction which impedes the swirling of the air from said primary induction passage around said axis,
   a second throttle valve operatively disposed in said second induction passage,
   a pressure differential responsive motor which is fluidly connected with said venturi and which is operatively connected with said second throttle valve for moving said second throttle valve in response to the degree of vacuum prevailing at said venturi, an inlet valve which controls both said first and second inlet ports, a fuel injector disposed in said secondary induction passage, said fuel injector being so positioned as to inject fuel toward a head of said inlet valve so that said fuel impinges on said valve head and thereafter disperses radially outwardly, and means for controlling said fuel injector in response to an output of said air flow meter and in synchronism with opening of said inlet valve.

2. The system as claimed in claim 1 wherein the head of said intake valve is beveled.

* * * * *